(12) United States Patent
Shimizu et al.

(10) Patent No.: US 8,525,473 B2
(45) Date of Patent: Sep. 3, 2013

(54) CHARGING SYSTEM FOR HYBRID AND ELECTRIC VEHICLES INCLUDING AN AUTHENTICATION MANAGEMENT DEVICE ARRANGED IN THE HOUSEHOLD

(75) Inventors: Tomomi Shimizu, Aichi (JP); Yoshiyuki Mizuno, Aichi (JP); Kenji Tanaka, Aichi (JP); Mikihisa Araki, Aichi (JP); Hiroaki Iwashita, Aichi (JP); Keiji Yamamoto, Okazaki (JP); Masayuki Yurimoto, Toyota (JP); Jun Shionoya, Nagoya (JP)

(73) Assignees: Kabushiki Kaisha Tokai Rika Denki Seisakusho, Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 545 days.

(21) Appl. No.: 12/090,277

(22) PCT Filed: Jul. 11, 2007

(86) PCT No.: PCT/JP2007/063857
§ 371 (c)(1),
(2), (4) Date: Apr. 15, 2008

(87) PCT Pub. No.: WO2008/026390
PCT Pub. Date: Mar. 6, 2008

(65) Prior Publication Data
US 2009/0278492 A1    Nov. 12, 2009

(30) Foreign Application Priority Data
Aug. 31, 2006    (JP) ................................ 2006-236912

(51) Int. Cl.
*H02J 7/00*    (2006.01)

(52) U.S. Cl.
USPC ........................................................ 320/109

(58) Field of Classification Search
USPC .................. 320/107, 108, 109, 111, DIG. 12
See application file for complete search history.

(56) References Cited

U.S. PATENT DOCUMENTS

| | | | | |
|---|---|---|---|---|
| 3,270,267 A | * | 8/1966 | Nolte, Jr. ........................ | 320/138 |
| 5,323,099 A | * | 6/1994 | Bruni et al. .................... | 320/108 |
| 5,654,621 A | * | 8/1997 | Seelig ............................ | 320/108 |
| 5,774,043 A | * | 6/1998 | Mizuno et al. ........... | 340/426.35 |
| 5,886,421 A | * | 3/1999 | Mizuno et al. ............... | 307/10.5 |
| 6,104,160 A | * | 8/2000 | Iwata et al. .................... | 320/103 |
| 6,614,204 B2 | * | 9/2003 | Pellegrino et al. ............ | 320/109 |
| 6,833,784 B1 | | 12/2004 | Ishii et al. | |
| 7,613,924 B2 | * | 11/2009 | Shankar et al. ............... | 713/168 |
| 7,667,429 B2 | * | 2/2010 | Little ............................. | 320/106 |

(Continued)

FOREIGN PATENT DOCUMENTS

| | | |
|---|---|---|
| EP | 0 986 034 A2 | 3/2000 |
| EP | 1 667 306 A1 | 6/2006 |

(Continued)

Primary Examiner — Yalkew Fantu
Assistant Examiner — Manuel Hernandez
(74) Attorney, Agent, or Firm — Patterson Thuente Pedersen, P.A.

(57) ABSTRACT

A charging system that significantly increases the anti-theft capability of a charging subject. The charging subject includes a rechargeable battery. The rechargeable battery of the charging subject is connected to a power supply of a house by power lines. An authentication management device performs authentication of the charging subject by communicating with the charging subject through the power lines and permits charging of the rechargeable battery with the power supply of the house only when the authentication is established.

17 Claims, 4 Drawing Sheets

(56) References Cited

U.S. PATENT DOCUMENTS

| | | | |
|---|---|---|---|
| 7,715,884 B2* | 5/2010 | Book et al. | 455/572 |
| 2005/0001589 A1* | 1/2005 | Edington et al. | 320/128 |
| 2005/0010782 A1* | 1/2005 | Ohkubo | 713/182 |
| 2005/0108309 A1* | 5/2005 | Tsuboka et al. | 708/250 |
| 2005/0166651 A1* | 8/2005 | Stoschek et al. | 70/264 |
| 2006/0119315 A1 | 6/2006 | Sasaki et al. | |
| 2006/0119316 A1 | 6/2006 | Sasaki et al. | |
| 2007/0278992 A1* | 12/2007 | Paul et al. | 320/107 |
| 2009/0062967 A1* | 3/2009 | Kressner et al. | 700/286 |
| 2009/0177595 A1* | 7/2009 | Dunlap et al. | 705/412 |
| 2010/0010698 A1* | 1/2010 | Iwashita et al. | 701/22 |

FOREIGN PATENT DOCUMENTS

| | | |
|---|---|---|
| JP | 10-262303 | 9/1998 |
| JP | 2000-050508 | 2/2000 |
| JP | 2000-517487 | 12/2000 |
| JP | 2001-078302 | 3/2001 |
| JP | 2003-023378 | 1/2003 |
| JP | 2004-147408 | 5/2004 |
| JP | 2006-164547 | 6/2006 |
| WO | WO 97/23986 | 7/1997 |
| WO | WO 9723986 A1 * | 7/1997 |

* cited by examiner

CHARGING SYSTEM FOR HYBRID AND ELECTRIC VEHICLES INCLUDING AN AUTHENTICATION MANAGEMENT DEVICE ARRANGED IN THE HOUSEHOLD

FIELD OF THE INVENTION

The present invention relates to a charging system for supplying power from a household power supply to a charging subject, or a rechargeable battery.

BACKGROUND OF THE INVENTION

Over these past few years, hybrid vehicles and electric vehicles, which are types of vehicles other than engine automobiles that are driven only by an engine, have become popular. A hybrid vehicle is driven by a drive source that uses both an engine and a motor, and an electric vehicle is driven by a motor as types of vehicles other than engine vehicles that are powered only by an engine. In this type of electrically-driven vehicle, the battery must be charged when the voltage of the battery decreases. When performing the charging with a household power supply (commercial power supply: AC 100 V), the charging is carried out by connecting an input of an external charging device, such as a charging cable, to a household socket and connecting an output of the external charging device to a charging connector of the vehicle.

When charging the battery with a household power supply, the battery of the electrically-driven vehicle may be charged, without any limitations, with the power supplied from the household socket by simply plugging in the external charging device to a household socket. Therefore, if the electrically-driven vehicle is stolen, the thief would be able to continuously drive the stolen vehicle since the battery of the stolen vehicle can be repeatedly charged by a household power supply by using the external charging device. It is believed that this is a factor that leads to theft of an electrically-driven vehicle. Thus, it is required that an anti-theft measure be provided to reduce the number of vehicle thefts.

Patent document 1 discloses an example of a charging action authentication system for the charging of a battery of an electrically-driven vehicle in order to increase the anti-theft capability of an electrically-driven vehicle. This technique uses a read-write device capable of reading information from an IC card, which is used as a vehicle key, and writing information to the IC card. When performing charging with the charging device, the authorized user removes the IC card from the vehicle and inserts it into the read-write device. If the IC card is authenticated, the battery charging of the battery is permitted.

However, even when employing the technique of limiting charging actions through the authentication establishment of an IC card, the battery can still be charged if the IC card is stolen. In such a case, this technique is ineffective. Particularly, since the owner of the IC card usually carries the IC card, the IC card may be stolen if the owner is not careful. Accordingly, the prevention of vehicle theft cannot be sufficiently ensured regardless of the employment of a system that carries out authentication when charging is performed with a household power supply.

[Patent Document 1] Japanese Laid-Open Patent Publication No. 10-262303

SUMMARY OF THE INVENTION

The present invention provides a charging system that sufficiently increases the anti-theft capability of a charging subject.

A first aspect of the present invention is a charging system for use with a household power supply. The charging system includes a charging subject including a rechargeable battery. A power line is connectable between the rechargeable battery of the charging subject and the household power supply. An authentication management device connectable to the power supply performs authentication of the charging subject through at least part of the power line. The charging subject permits charging of the rechargeable battery with the power supply when the authentication is established with the authentication management device and the charging subject.

A second aspect of the present invention is a charging system for use with a household power supply. The charging system includes a charging subject including a rechargeable battery. A power line is connectable between the rechargeable battery of the charging subject and the household power supply. An authentication management device connectable to the power supply performs authentication of the charging subject through an electrical wiring arranged independent from the power line. The charging subject permits charging of the rechargeable battery with the power supply when the authentication is established with the authentication management device and the charging subject.

DETAILED DESCRIPTION OF THE PREFERRED EMBODIMENTS

First Embodiment

A charging system according to a first embodiment of the present invention will now be described with reference to FIGS. 1 and 2.

Figure 1:
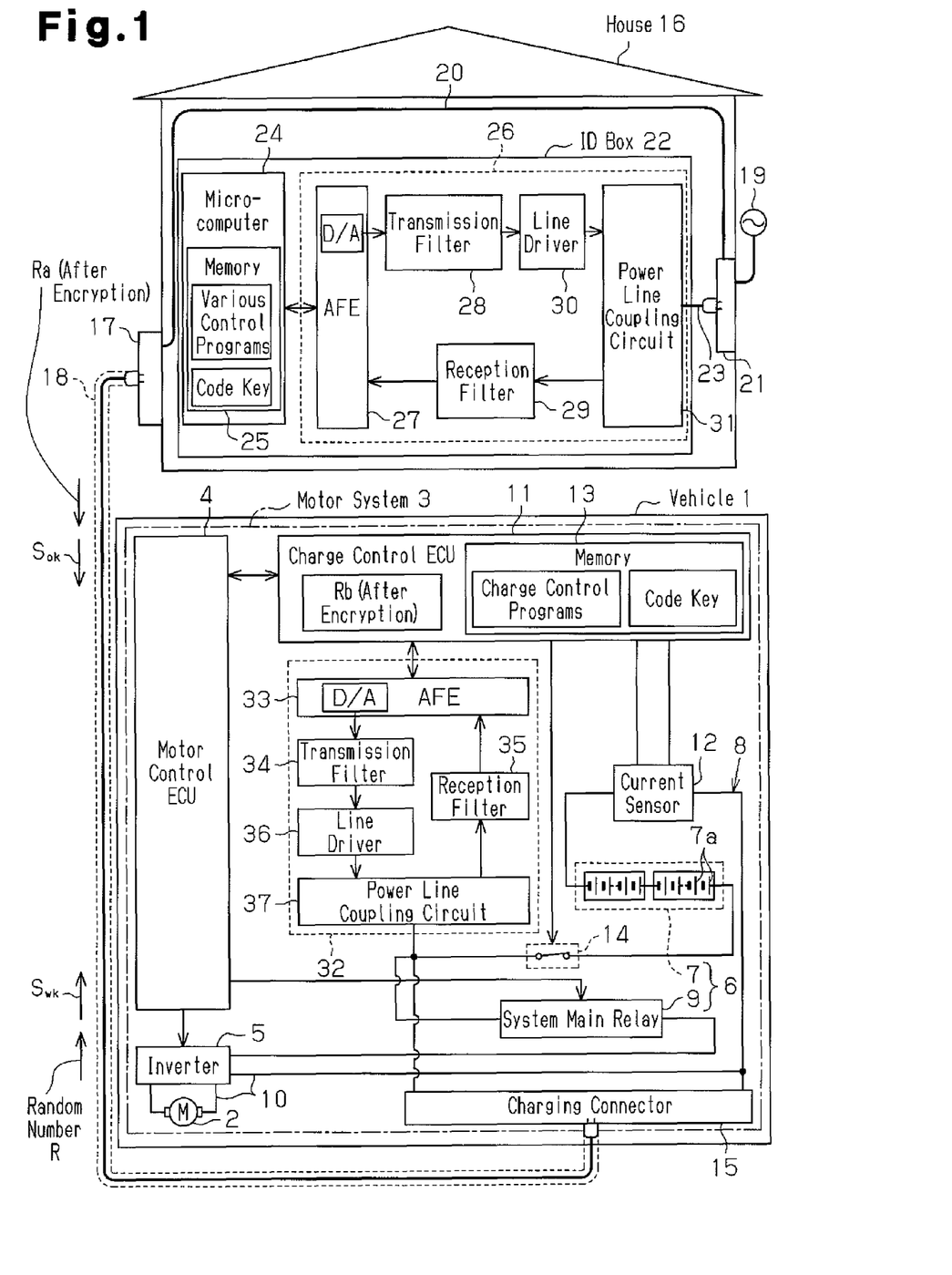
FIG. 1 is a schematic block diagram showing the structure of a charging system according to a first embodiment of the present invention.
Figure 2:
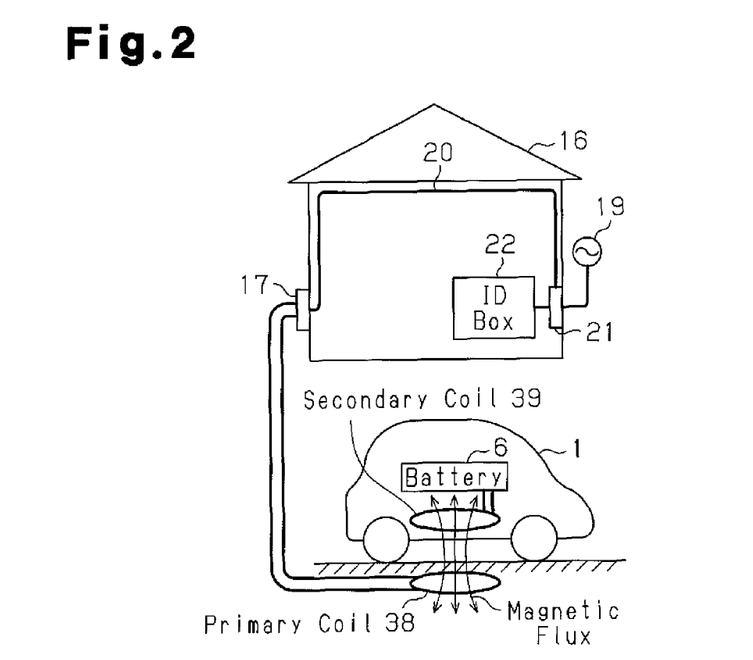
FIG. 2 is a schematic diagram showing the structure of the charging system using a coil for a vehicle charging connection.

Referring to FIG. 1, if the vehicle 1 is an electrically-driven vehicle, a motor system 3 is installed in the vehicle 1 for drive-controlling a motor 2 which serves as a vehicle power source when driving the electrically-driven vehicle. The motor system 3 is activated from a deactivated state by operating a start switch (not shown) of an engine system while a gearshift lever is arranged at a parking position and a brake pedal is depressed. The motor system 3 is deactivated from an activated state by operating the start switch while the gearshift lever is arranged at the parking position and the vehicle velocity is "0". The vehicle 1 corresponds to the charging subject.

The motor system 3 includes a motor control ECU 4 that controls the driving of the vehicle 1. The motor 2, which serves as a drive source, is connected to the motor control ECU 4 via an inverter 5. The motor control ECU 4 drive-controls the motor 2 by obtaining the motor torque that corresponds to the operation state based on an acceleration pedal degree, gearshift position, and output signals from various sensors. Then, the motor control ECU 4 drives the motor 2 by generating a flow of current that is in correspondence with the calculated motor torque.

A battery 6, which serves as the power supply of the motor 2, is installed in the vehicle 1. The battery 6 includes a battery module 7, which has a plurality of series-connected cells 7a, and a system main relay 9, which is connected in series to a high voltage power supply circuit 8 of the battery module 7. The inverter 5 is connected to the motor 2 by a power cable 10 capable of supplying high voltage and large current. A different power cable 10 connects the inverter 5 to the battery 6. The system main relay 9 is connected to the motor control ECU 4 through electrical wirings. The motor control ECU 4 generates commands for connection to or disconnection from the high voltage power supply circuit 8 with the system main relay 9. The battery 6 corresponds to a rechargeable battery.

A charging control ECU 11 for monitoring the charging of the battery 6 is connected to the motor control ECU 4 through controller area network (CAN) communication. A current sensor 12 for detecting the amount of current flowing to the high voltage power supply circuit 8 is connected to the charging control ECU 11. The current sensor 12 is connected in series with the battery module 7 in the wiring of the high voltage power supply circuit 8 to provide the charging control ECU 11 with a detection signal corresponding to the value of the current flowing to the high voltage power supply circuit 8.

A charge monitoring control program is written to a memory 13, which includes a ROM and EEPROM, in the charging control ECU 11. The charging control ECU 11 operates in accordance with the charge monitoring control program to perform processes such as the monitoring of the charging state (whether or not charging is being performed) and monitoring of the charging amount (state of charge) of the battery 6. Then, the charging control ECU 11 provides the processing result (charging information) to the motor control ECU 4. The motor control ECU 4 recognizes the charging state and the charging amount of the battery 6 based on the charging information provided from the charging control ECU 11.

A switch 14 for activating and deactivating the high voltage power supply circuit 8 is connected in series to the high voltage power supply circuit 8. The series-connected circuit including the battery 6, the current sensor 12, and the switch 14 is connected in parallel to a charging connector 15. The switch 14 is controlled to be normally closed. Further, the switch 14 is open when the charging control ECU 11 executes control that disables charging. In such a case, the battery 6 cannot be charged. The switch 14 is connected to the charging control ECU 11 through electrical wiring and is switched between open and closed states based on commands from the charging control ECU 11.

The charging connector 15, which serves as an electrical inlet when the battery 6 is charged, is arranged in the vehicle 1. The charging connector 15 is connected in series to the series-connected circuit of the battery module 7 and the current sensor 12. One end of a charging cable 18 is connected to the charging connector 15. The charging cable 18 has another end that is formed to be insertable into an outdoor outlet 17 of a house 16. When the charging cable 18 connects the charging connector 15 and outdoor outlet 17, current flows from a household power supply 19 (commercial power supply, e.g., AC 100 V) of the house 16 to the battery 6 through a power line in the charging cable 18 to charge the battery 6. The charging cable 18 forms the power line, and the household power supply 19 corresponds to the power supply.

The outdoor outlet 17 is connected to an indoor outlet 21 by an indoor power line 20 arranged indoor as current flow path. The indoor outlet 21 is connected to the household power supply 19. That is, the charging system of the first embodiment is of a direct connection type in which the indoor power line 20 extending from the outdoor outlet 17 is directly connected to the indoor outlet 21. An ID box 22 for performing authentication with the charging control ECU 11 through codes when charging the battery 6 is connected to the indoor outlet 21. The ID box 22 is an authentication device which forms a single independent unit. A connection cord 23 extending out of a case of the ID box 22 is connectable to the indoor outlet 21. The indoor power line 20 forms a power line (second power line or branched power line). The indoor outlet 21 corresponds to an outlet, and the ID box 22 forms an authentication management device.

The ID box 22 includes a microcomputer 24 for performing a data communication process with the charging control ECU 11 through power line communication. The microcomputer 24 stores a charge limitation program in a memory 25. The microcomputer 24 performs authentication between the charging control ECU 11 and the ID box 22 in accordance with the charge limitation program and permits the charging of the battery 6 on the condition that authentication is established. A code key used for authentication is registered in the memory 25 of the microcomputer 24. The same code key is also registered in the memory 13 of the charging control ECU 11. Thus, the code keys match when the charging control ECU 11 and the ID box 22 are both authentic.

A household power line communication module 26, which is operated when power line communication is performed, is connected to the microcomputer 24. The household power line communication module 26 includes an analog front end (AFE) 27, which is connected to the microcomputer 24 and functions as a signal converter.

A transmission filter 28, which performs transmission processes on various signals transmitted from the microcomputer 24 to the charging control ECU 11, and a reception filter 29, which performs reception processes on various signals received by the ID box 22 through power lines such as the indoor power line 20, are connected to the analog front end 27. For instance, the transmission filter 28 performs a process for transmitting packets of data. The transmission filter 28 integrates the necessary data to generate a single data unit and divides the data unit into packets to adjust the transmission speed and control multiplex transmission. The reception filter 29 performs a process for restoring a data unit from a plurality of received packets and retrieving the necessary data from the data unit.

A line driver 30 for converting an output signal of the transmission filter 28 to a differential output is connected to the transmission filter 28. A power line coupling circuit 31 for coupling various signal lines in the household power line communication module 26 to a power line system wiring is connected to the reception filter 29 and the line driver 30. The connection cord 23 extending from the power line coupling circuit 31 is connectable to the indoor outlet 21.

A charge limitation program similar to that registered in the ID box 22 is stored in the memory 13 of the charging control ECU 11. A vehicle power line communication module 32, which is similar to the household power line communication module 26 arranged in the house 16, is arranged in the vehicle 1 along a path that branches from the high voltage power supply circuit 8 and leads to the charging control ECU 11. The vehicle power line communication module 32 includes an analog front end 33, a transmission filter 34, a reception filter 35, a line driver 36, and a power line coupling circuit 37 in the same manner as the household power line communication module 26.

The operation of the charging system of the first embodiment will now be discussed.

First, when charging the battery 6 of the vehicle 1, one end of the charging cable 18 is connected to the charging connector 15 and the other end of the charging cable 18 is connected to the outdoor outlet 17 of the house 16. Then, current starts to flow from the household power supply 19 of the house 16 to the high voltage power supply circuit 8 through the indoor power line 20 and the charging cable 18. In this state, the system main relay 9 is deactivated, and the motor system 3 is not active. The charging control ECU 11 recognizes that the charging operation of the battery 6 has started when detecting the flow of current to the high voltage power supply circuit 8 through the vehicle power line communication module 32.

When the charging operation starts, the charging control ECU 11 sends an ID box activation signal Swk for activating the ID box 22 to the charging cable 18 (i.e., power line) through the analog front end 33, the transmission filter 34, the line driver 36, and the power line coupling circuit 37. The charging control ECU 11 transmits the ID box activation signal Swk to the ID box 22 through power line communication using the charging cable 18 and the indoor power line 20.

The ID box 22 receives the ID box activation signal Swk through the charging cable 18 and the indoor power line 20. The microcomputer 24 acquires the ID box activation signal Swk through the power line coupling circuit 31, the reception filter 29, and the analog front end 27.

In response to the ID box activation signal Swk, the microcomputer 24 is activated when decrypting the data content of the ID box activation signal Swk. After performing various processes, such as initialization, and recognizing completion of the activation, the microcomputer 24 sends an activation completion signal Sok to the indoor power line 20 through the analog front end 27, the transmission filter 28, the line driver 30, and the power line coupling circuit 31. The microcomputer 24 transmits the activation completion signal Sok to the charging control ECU 11 through power line communication using the indoor power line 20 and the charging cable 18.

The charging control ECU 11 receives the activation completion signal Sok through the power line coupling circuit 37, the reception filter 35, and the analog front end 33. In response to the activation completion signal Sok, the charging control ECU 11 establishes an encrypted communication path and authenticates the ID box 22 through encrypted communication. A challenge-response method may be employed for the authentication. In this case, the charging control ECU 11 generates a predetermined random number R and transmits the random number R to the ID box 22 through power line communication. The microcomputer 24 of the ID box 22 generates an encrypted random number Ra by encrypting the received random number R with its own code key (public key). The microcomputer 24 then returns the encrypted random number Ra to the charging control ECU 11 through power line communication.

When transmitting the random number R to the ID box 22, the charging control ECU 11 encrypts the random number R with its own code key (public key) to generate an encrypted random number Rb. The charging control ECU 11 performs authentication of the ID box 22 by comparing the encrypted random number Ra received from the ID box 22 and the generated encrypted random number Rb.

If the charging control ECU 11 and the ID box 22 are both authentic, the code keys match. That is, the encrypted random number Ra matches the encrypted random number Rb. In this case, the charging control ECU 11 determines that the ID box 22 of the communication destination is authentic and recognizes authentication establishment. When recognizing authentication establishment, the charging control ECU 11 keeps the switch 14 activated to maintain the high voltage power supply circuit 8 in a closed state. Thus, current continues to flow from the commercial power supply of the house 16 to the battery 6 so as to charge the battery 6.

When detecting that the encrypted random numbers Ra and Rb do not match, that is, when recognizing non-establishment of authentication, the charging control ECU 11 switches the switch 14 from an activated state to a deactivated state to open the high voltage power supply circuit 8. As a result, current does not flow from the commercial power supply of the house 16 to the battery 6. Thus, the battery 6 is not charged. Subsequently, when current no longer flows to the high voltage power supply circuit 8 due to removal of the charging cable 18 from the charging connector 15 or the like, the charging control ECU 11 detects such a state through the vehicle power line communication module 32 and returns the switch 14 to an activated state.

In the event that the vehicle 1 is stolen by a third party, the thief must also steal the ID box 22 installed in the house 16 to continuously drive the stolen vehicle. Otherwise, the battery 6 cannot be charged. However, the ID box 22 is difficult to steal as if it is located in the house 16. It would be further difficult to steal the ID box 22 if it is arranged at a location difficult to find. Thus, the thief would consider the difficulty in stealing both the vehicle 1 and the ID box 22. This would lower motivation of the thief for stealing the vehicle and, in turn, effectively increase the anti-theft capability of the vehicle 1.

The charging connection of the battery 6 of the vehicle 1 and the household power supply 19 of the house 16 is not limited to the wired line using the charging cable 18. For example, referring to FIG. 2, the charging connection may be a magnetic wiring for magnetic connection to the vehicle 1 and the household power supply 19 with the use of a primary coil 38 and a secondary coil 39. That is, the primary coil 38 connected to the outdoor outlet 17 is buried in the ground, and the secondary coil 39 is arranged in the vehicle 1. The secondary coil 39 is connected to the battery 6 such that current induced by the secondary coil 39 flows to the battery 6.

When charging the battery 6, the user parks the vehicle 1 so that the secondary coil 39 of the vehicle 1 faces toward the primary coil 38. The primary coil 38 is connected to the outdoor outlet 17 in this state so that current flows to the primary coil 38. This generates magnetic flux in the primary coil 38, the magnetic flux is applied to the secondary coil 39, and current is induced at the secondary coil 39. As a result, the battery 6 is charged by the current flowing to the secondary coil 39. In this case, when authentication is performed, the frequencies of the transmitted and received signals that are exchanged during data communication are set to be significantly higher than the frequency of the charging current to perform communication through current fluctuation at a frequency that is significantly higher than the frequency of the charging current.

The charging system of the first embodiment has the advantages described below.

(1) The battery 6 must be charged on a regular basis in order to continuously use the vehicle 1, which is an electric vehicle or the like. Therefore, in order to continuously drive the stolen vehicle 1, the thief must also steal the ID box 22 from the house 16 to charge the battery 6. However, it is difficult to steal the ID box 22 from the house 16. This lowers the motivation of the thief to steal the vehicle and increases the vehicle anti-theft capability. The charging cable 18 connecting the charging control ECU 11 and the ID box 22 and the indoor power line 20 is used as data communication paths. Thus, the problem of radio wave noise influence etc., which is a matter of concern for wirelessly connection, does not need to be considered. Accordingly, a situation in which communication is interrupted when the charging control ECU 11 is performing authentication with the ID box 22 is unlikely to occur, and the reliability of authentication is ensured.

(2) Power line communication is performed for data communication between the charging control ECU 11 and the ID box 22. Thus, the charging cable 18 and the indoor power line 20 serve as both the power system wiring and the control system wiring. Accordingly, a control system wiring serving as a data communication path does not need to be newly added when performing authentication between the charging control ECU 11 and the ID box 22, and the number of components does not have to be increased.

(3) Codes are used for the authentication between the charging control ECU 11 and the ID box 22. This increases the authentication reliability when determining whether or not to permit charging. Therefore, a situation in which authentication is established in an illegitimate manner between the charging control ECU 11 and the ID box 22 is less likely to occur. This is effective in preventing unauthorized charging.

(4) A wired system using the charging cable 18 is employed when charging the battery 6 of the vehicle 1 with the household power supply 19. Thus, the battery 6 may be charged with a relatively inexpensive conventional system.

(5) The charging system employs a direct method in which the indoor power line 20 extending from the outdoor outlet 17 is directly connected to the indoor outlet 21 without passing through the ID box 22. Further, the ID box 22 is an independent component. Therefore, only one action is required to connect the connection cord 23 extending from the ID box 22 to the indoor outlet 21 when setting the ID box 22 in a house. This facilitates the connection.

(6) The battery 6 may be charged through magnetic wiring with the primary coil 38 and the secondary coil 39. In this case, the vehicle 1 does not need to be connected to the household power supply 19 with a charging system cable component when charging the battery 6. Thus, the battery 6 can be easily charged.

Second Embodiment

A charging system according to a second embodiment of the present invention will now be described with reference to FIG. 3. The second embodiment illustrates connection of the indoor power line 20 to the ID box 22 that differs from that of the first embodiment. The same reference numerals are used to denote portions that are the same as those in the first embodiment, and such portions will not be described in detail.

Figure 3:
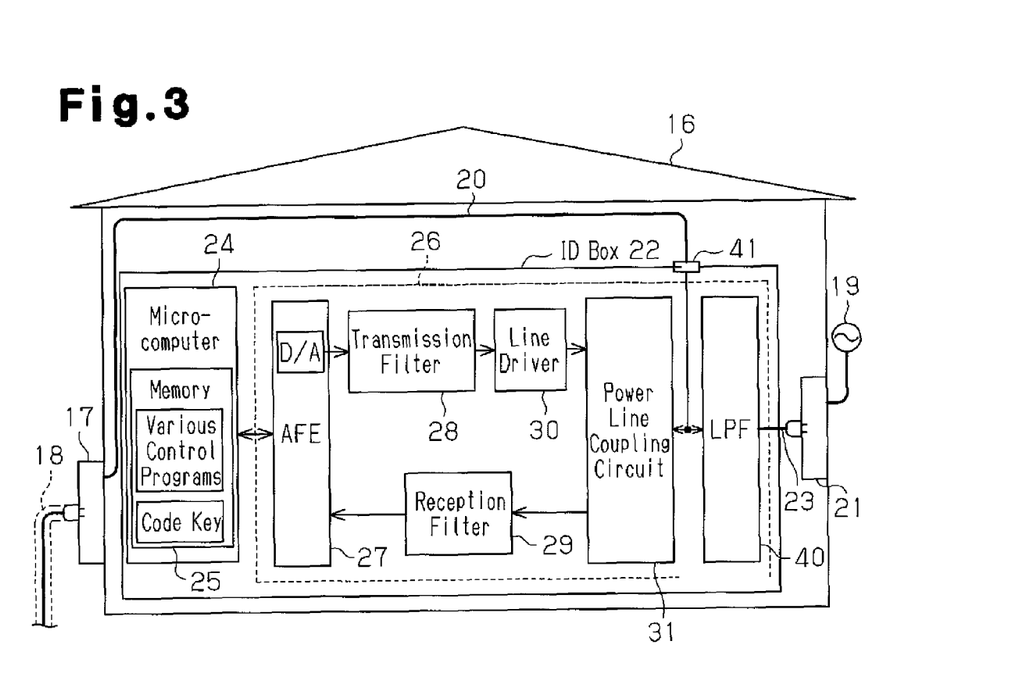
FIG. 3 is a schematic block diagram showing the structure of an ID box according to a second embodiment of the present invention.

Referring to FIG. 3, the charging system of the second embodiment employs a division method in which the indoor power line 20 is connected to the household power supply 19 via the ID box 22 is adopted in the second embodiment. In addition to the components in the ID box 22 (FIG. 1) of the first embodiment, the ID box 22 of the second embodiment includes a low pass filter (LPF) 40 for eliminating low frequency components from an input signal. The low pass filter 40 is connected to the power line coupling circuit 31 in the ID box 22 and to the indoor outlet 21 outside the ID box 22 by the connection cord 23. The low pass filter 40 is arranged to prevent high frequency components superimposed on the indoor power line 20 from being output to the household power supply 19.

A connector 41, which is connectable to an exterior power line system wiring, is arranged in the ID box 22. The connector 41 is electrically connected to both the power line coupling circuit 31 and the low pass filter 40 in the ID box 22. The indoor power line 20 is connectable to the connector 41 of the ID box 22. The ID box 22 receives power from the household power supply 19 through the connection cord 23 connected to the indoor outlet 21. Thus, when the indoor power line 20 is connected to the connector 41 of the ID box 22, current flows from the household power supply 19 to the indoor power line 20.

When detecting the flow of current to the battery 6 through the charging cable 18 connected to the charging connector 15 of the vehicle 1, the charging control ECU 11 transmits the ID box activation signal Swk to the ID box 22 through power line communication with the charging cable 18 and the indoor power line 20. In response to the ID box activation signal Swk received via the connector 41, the ID box 22 is activated. The transmission of the activation completion signal Sok and the authentication process between the charging control ECU 11 and the ID box 22 are performed in the same manner as in the first embodiment and thus will not be described in detail. Current flows from the household power supply 19 to the indoor power line 20 through the low pass filter 40 in the ID box 22. Then, the current flows to the battery 6 of the vehicle 1 through the charging cable 18.

Accordingly, the charging system of the second embodiment, which employs the division method, can charge the battery 6 of the vehicle 1 by directly connecting the charging cable 18 to the connector 41 of the ID box 22. Thus, the battery 6 may be charged if the ID box 22 is at hand even if the outdoor outlet 17 is not located nearby by connecting the charging cable 19 to the ID box 22.

The charging system of the second embodiment has the advantage below in addition to advantages (1) to (4) and (6) of the first embodiment.

(7) In the charging system employing the division method, the battery 6 can be connected to the household power supply 19 by connecting the charging cable 18 to the connector 41 of the ID box 22 even if the outdoor outlet 17 is not located nearby when charging the battery 6. Therefore, the battery 6 can be charged even if the outdoor outlet 17 is not nearby.

Third Embodiment

Figure 4:
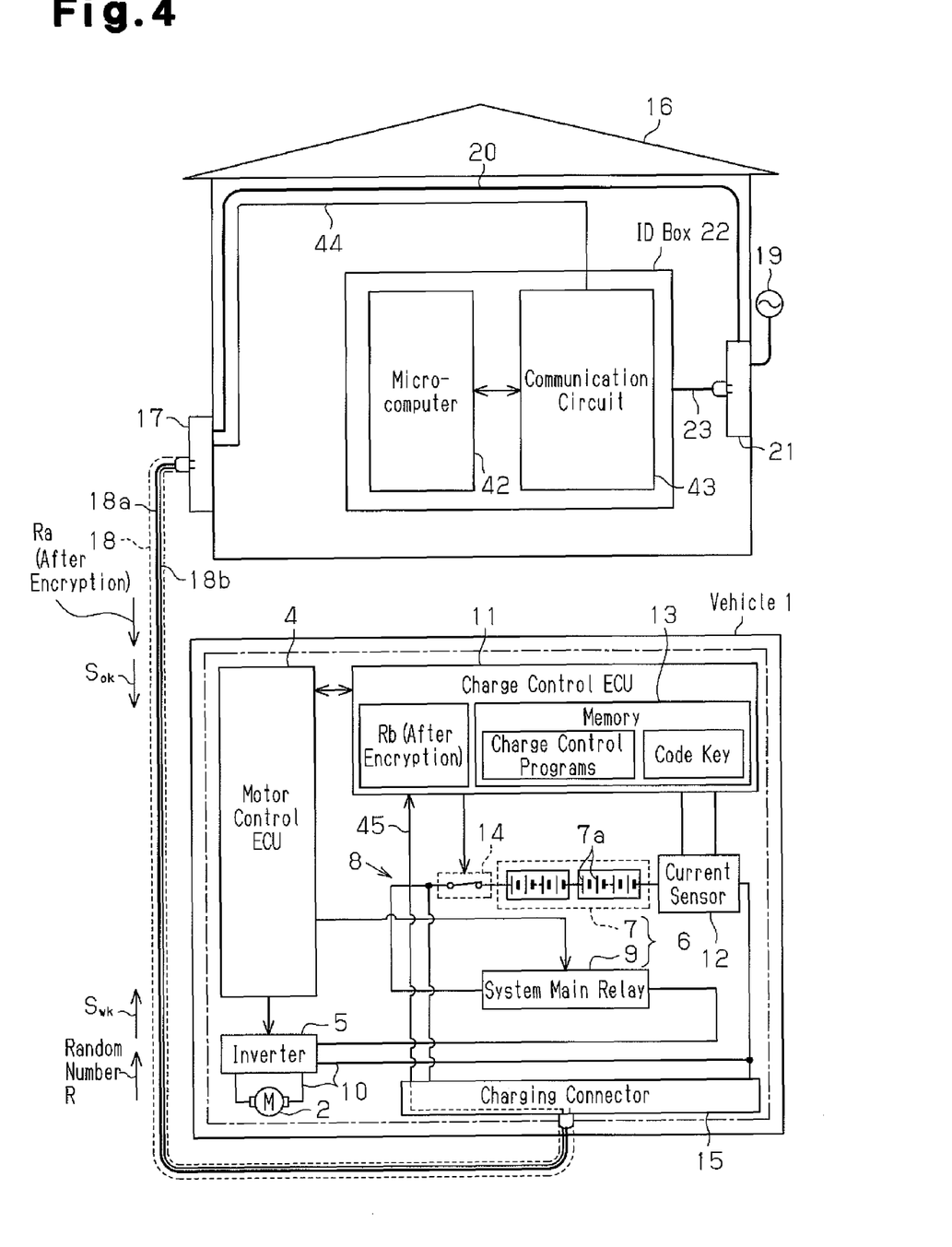
FIG. 4 is a schematic block diagram showing the structure of a charging system according to a third embodiment of the present invention uses a data communication control line.

A charging system according to a third embodiment of the present invention will now be described with reference to FIG. 4. The third embodiment illustrates communication between the charging control ECU 11 and the ID box 22 that differs from the first embodiment. The same reference numerals are used to denote portions that are the same as those in the first embodiment, and such portions will not be described in detail.

In the third embodiment, instead of communication through a power line, communication is performed between the charging control ECU 11 and the ID box 22 with control system wiring used exclusively for data communication. A microcomputer 42 for executing a data communication process through the control system wiring is arranged in the ID box 22. A communication circuit 43, which performs various processes such as modulation of output data and demodulation of input data during data communication with the microcomputer 42, is connected to the microcomputer 42.

One end of an indoor control line 44, which serves as a data communication path, is connected to the communication circuit 43 of the ID box 22. Another end of the indoor control line 44 is connected to the outdoor outlet 17. That is, the indoor control line 44 connects the ID box 22 to the outdoor outlet 17. The outdoor outlet 17 of the third embodiment is an outlet component that enables data transmission through the indoor control line 44 in addition to current transfer through the indoor power line 20. The indoor control line 44 forms an electrical wiring.

The charging cable 18 is formed by a power line 18a, which serves as a flow path for current flowing from the household power supply 19, and a control line 18b, which serves as a data communication path between the charging control ECU 11 and the ID box 22. The charging cable 18 is a single cable component accommodating the power line 18a and the control line 18b in a coating material such as carbon. When the charging cable 18 is connected to the charging connector 15, the control line 18b in the charging cable 18 is connected to the charging control ECU 11 through a communication line 45, which connects the charging connector 15 and the charging control ECU 11 in the vehicle 1. The power line 18a forms a power line, and the control line 18b forms electric wiring.

The charging control ECU 11 receives notification of connection between the charging cable 18 and the charging connector 15 from the ID box 22 that is in a standby state through the indoor control line 44, the control line 18b, and the communication line 45. In response to the cable connection notification, the charging control ECU 11 transmits the ID box activation signal Swk for activating the ID box 22 to the ID box 22 through the communication line 45, the control line 18b, and the indoor control line 44. The microcomputer 24 receives the ID box activation signal Swk from the charging control ECU 11 through the communication circuit 43 and starts activation of the ID box 22 in response.

After recognizing activation completion of the ID box 22, the microcomputer 42 transmits the activation completion signal Sok to the charging control ECU 11 through the indoor control line 44, the control line 18b, and the communication line 45. The charging control ECU 11 performs authentication of the ID box 22 through the indoor control line 44, the control line 1b, and the communication line 45. In this case, current flows from the household power supply 19 to the battery 6 of the vehicle 1 through the indoor power line 20 and the power line 18a. The charging control ECU 11 returns the switch 14 to an activated state when the charging cable 18 is removed from the charging connector 15 and a signal is no longer received from the cable control line 18b.

The power line is not originally designed for the transfer of an electric signal having a high frequency. Thus, if the power line were to be used for power line communication, radio waves would leak from the power line and the frequency of the radio waves may overlap short wave bands. This may adversely affect short wave radio and ham radio broadcasts. However, since the data communication control lines 18b and 44 are used for data communication between the charging control ECU 11 and the ID box 22 in the third embodiment, there is no need to worry about the various problems that may arise when performing power line communication.

The charging system of the third embodiment has the advantage described below in addition to the advantages (1) and (3) to (6) of the first embodiment.

(8) The control lines 18b and 44 are used exclusively for the data communication path between the charging control ECU 11 and the ID box 22. Thus, there is no need to worry above the leakage of radio waves that would occur when power line communication is performed, and a situation in which surrounding short wave radio and ham radio broadcasts are adversely affected is avoided. Exclusive use of the control lines 18b and 44 for the data communication path between the charging control ECU 11 and the ID box 22 is applicable charging systems employing any one of the direct method and division method.

Fourth Embodiment

A charging system according to a fourth embodiment of the present invention will now be described with reference to FIG. 5. The fourth embodiment illustrates the ID box 22 described in the first embodiment with a different structure. The same reference numerals are used to denote portions that are the same as those in the first embodiment, and such portions will not be described in detail.

Figure 5:
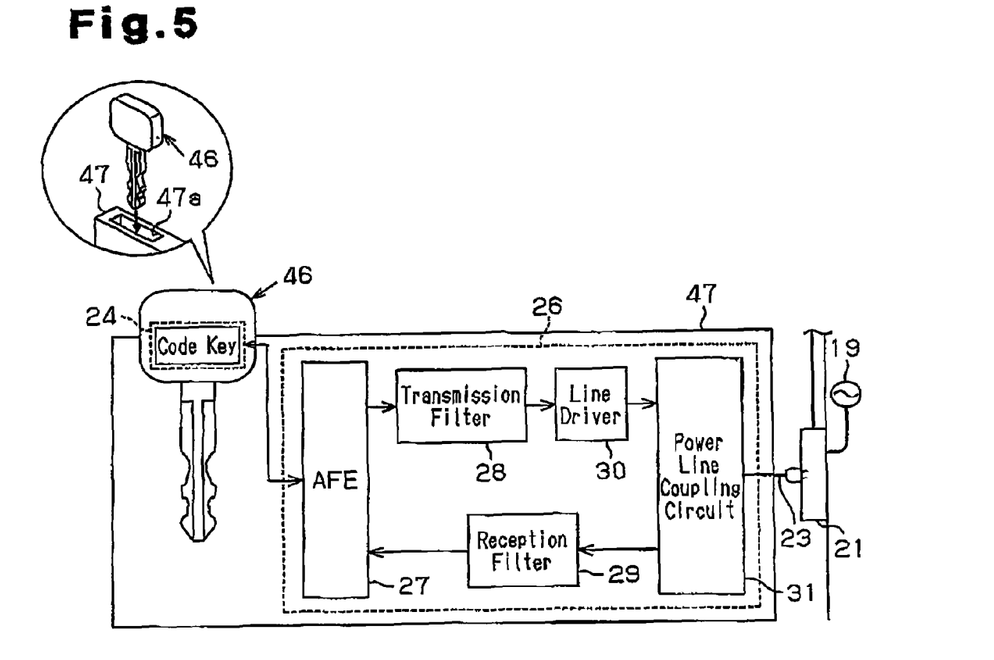
FIG. 5 is a schematic block diagram showing the structure of an ID box system device according to a fourth embodiment of the present invention.

Instead of the ID box 22 that forms a single independent authentication device as shown in FIG. 1, an ID box system device of the fourth embodiment includes a vehicle key 46 and a communication box 47 into which the vehicle key 46 can be inserted as shown in FIG. 5. The microcomputer 24 of FIG. 1 is incorporated in the vehicle key 46, and a unique code key for the key 46 is registered in the microcomputer 24. In addition to a normal mechanical key, the vehicle key 46 may be an electronic key that transmits an ID code, which is registered in the electronic key, to the vehicle 1 through wireless communication when the vehicle 1 is activated. If the vehicle key 46 is an electronic key, wireless communication mechanism may be incorporated in the microcomputer 24.

As shown in FIG. 5, the communication box 47 includes a slot 47a, which serves as a receptacle for the vehicle key 46. When the vehicle key 46 is completely inserted into the slot 47a, the microcomputer 24 is connected in a data communicable manner to the analog front end 27 of the household power line communication module 26 in the communication box 47. As described above, data communication may be performed through wired or wireless communication. If the communication box 47 is used as an ID box system device, authentication communication for determining whether or not to permit charging of the battery 6 is performed between the microcomputer 24 of the vehicle key 46 and the charging control ECU 11. The vehicle key 46 and the communication box 47 form an authentication management device.

When charging the battery 6 with the household power supply 19, the charging cable 18 is connected to the outdoor outlet 17 and then to the charging connector 15 of the vehicle 1. Then, the operator enters the house 16 and inserts his or her vehicle key into the slot 47a of the communication box 47, which is connected to the indoor outlet 21. When the vehicle key 46 is completely inserted into the slot 47a, the microcomputer 24 in the vehicle key 46 is electrically connected to the household power line communication module 26 of the communication box 47. This starts activation of the household power line communication module 26.

After recognizing completion of the activation of the household power line communication module 26 that includes the microcomputer 24, the microcomputer 24 transmits the activation completion signal Sok to the charging control ECU 11 through power line communication (or control line communication). The charging control ECU 11 checks whether or not the vehicle key 46 is authentic in response to the activation completion signal Sok. The authentication process is the same as that of the first embodiment and thus will not be described in detail.

The charging system of the fourth embodiment has the advantage described below in addition to advantages (1) to (6) of the first embodiment.

(9) For a thief to steal the vehicle 1 and charge the battery 6 of the stolen vehicle, the thief must also steal the vehicle key 46 in addition to the ID box 22. Therefore, in order to charge the stolen vehicle, the thief must steal two components, the ID box 22 and the vehicle key 46. This makes theft more difficult. Furthermore, the vehicle key 46 is usually carried around by the vehicle owner. Thus, it would be actually very difficult to steal both components. This would lower a thief's motivation for stealing the vehicle and significantly improve the anti-theft capability.

Fifth Embodiment

A charging system according to a fifth embodiment of the present invention will now be described with reference to FIG. 6. The fifth embodiment illustrates an ID box system device having a different structure. The same reference numerals are used to denote portions that are the same as those of the first embodiment, and such portions will not be described in detail.

Figure 6:
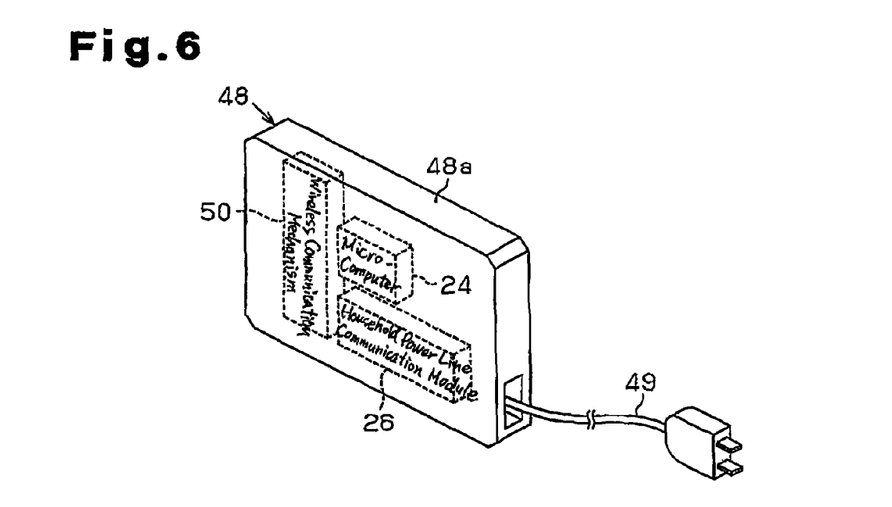
FIG. 6 is a schematic perspective view showing the structure of a vehicle key incorporating a plug of an ID box system device according to a fifth embodiment of the present invention.

Instead of the ID box 22 shown in FIG. 1 and the ID box system device (vehicle key 46 and communication box 47) shown in FIG. 5, the ID box system device of the fifth embodiment includes a plug-added vehicle key 48 as shown in FIG. 6. The vehicle key 48 includes a key body 48a, which incorporates the microcomputer 24 and the household power line communication module 26 of FIG. 1, and a plug 49, which is extendible from the key body 48a. A wireless communication mechanism 50 for performing ID code wireless communication with the vehicle 1 is incorporated in the key body 48a. The plug 49 is connectable to the indoor outlet 21 of the house 16 and accommodated in the key body 48a when not in use. The plug-added vehicle key 48 forms an authentication management device.

When charging the battery 6 with the household power supply 19, the charging cable 18 is connected to the outdoor outlet 17 and then to the charging connector 15 of the vehicle 1. The operator then enters the house 16, extends the plug 49 from his or her vehicle key 48, and connects the plug 49 to the indoor outlet 21.

When detecting the flow of current to the plug-added vehicle key 48 through the plug 49 connected to the indoor outlet 21, the microcomputer 24 in the vehicle key 48 is activated. After recognizing activation completion, the microcomputer 24 transmits the activation completion signal Sok to the charging control ECU 11 through power line communication (or control line communication). The charging control ECU 11 checks whether or not the vehicle key 48 is authentic in response to the activation completion signal Sok. The authentication process is the same as that performed in the first embodiment and will thus not be described in detail.

The charging system of the fifth embodiment has the advantage described below in addition to advantages (1) to (6) of the first embodiment.

(10) Even if the thief steals the vehicle 1, the battery 6 cannot be charged unless the thief also steals the vehicle key 48, which is usually carried by the vehicle owner. The vehicle key 48 is difficult to steal. This lowers the thief's motivation to steal the vehicle and ensures anti-theft capability of the vehicle 1. When the ID box 22 of FIG. 1 is used, standby energy would be consumed since the ID box 22 would constantly be connected to the indoor outlet 21. However, in the fifth embodiment, the plug 49 is connected to the outdoor outlet 17 only during use. Thus, standby energy is not consumed and power consumption of the household power supply 19 is effectively lowered.

The above embodiments may be modified as described below.

In the first to fifth embodiments, the authentication performed when determining whether or not to permit charging is not necessarily limited to the challenge-response method. A unique ID code may be given to each of the charging control ECU 11 and the ID box 22, and ID verification may be performed by determining whether the codes match. The ID verification may be biometrics authentication that collects fingerprints when performing charging and compares the fingerprints with fingerprint data registered in the ID box 22.

In the first to fifth embodiments, when authentication is performed with codes such as in the challenge-response method, the code key does not have to a public key and may be a private key.

In the first to fifth embodiments, encryption communication may be used for data communication between the charging control ECU 11 and the ID box 22. The codes used in such a case may be private key codes in compliance with the DES (Data Encryption Standard), AES (Advanced Encryption Standard), RC (Rivest Code) and the like; a public key code in compliance with the Diffie-Hellman method, RSA, ElGamal method and the like; or a hybrid code combining a private key and a public key.

In first to fifth embodiments, the ID box system device is not necessarily limited to a structure in which current automatically flows therein when connected to the household power supply 19. For example, a power supply switch may be arranged in the device body of the ID box system device so that power flows from the household power supply 19 into the device body when the power supply switch is turned on in a state connected to the household power supply 19.

In the third embodiment, the power line 18a and the control line 18b do not necessarily have to be included in the same cable (18) and may be included in different wirings.

In first to fifth embodiments, the vehicle 1 is not necessarily limited to an electric vehicle and may be a hybrid vehicle that uses both a motor and an engine as a drive source. The charging subject is not limited to a vehicle and may be an apparatus or device that operates on the battery 6, which serves as the drive source.

What is claimed is:

1. A charging system for use with a household power supply in a household, with the household including an outdoor outlet arranged therein the charging system including:
   an electrically-driven vehicle including a rechargeable battery;
   a power line connectable via the outdoor outlet of the household between the rechargeable battery of the vehicle and the household power supply; and
   an authentication management device, arranged in the household and connectable to the power supply, for performing authentication of the vehicle through at least part of the power line, with the vehicle being placed outside the household;
   wherein the vehicle includes:
      a switch, connected to the rechargeable battery, for permitting and prohibiting flow of current from the power supply to the rechargeable battery; and
      a charging control unit for performing the authentication in cooperation with the authentication management device and controlling the switch based on the authentication, wherein when the power line is connected to the outdoor outlet and a charging connector of the vehicle, charging of the rechargeable battery starts before the authentication is started, wherein after the charging of the rechargeable battery is started:

the charging control unit deactivates the switch to prohibit charging of the rechargeable battery when the authentication is not established with the authentication management device and the charging control unit;

the charging control unit keeps the switch activated to continue charging the rechargeable battery when the authentication is established with the authentication management device and the charging control unit.

2. The charging system according to claim 1, wherein the authentication management device performs the authentication through power line communication with the vehicle using the whole power line as a data communication path.

3. The charging system according to claim 1, wherein the authentication management device performs the authentication through communication that uses a code with the vehicle.

4. The charging system according to claim 1, wherein the power line is directly connected to the rechargeable battery and the power supply.

5. The charging system according to claim 1, wherein:

the power line includes a first power line connectable to the rechargeable battery, and a second power line arranged in the household, extended from an indoor outlet connected to the power supply, and connectable to the first power line; and the authentication management device is connectable to the indoor outlet and performs the authentication with the vehicle using the first power line and the second power line.

6. The charging system according to claim 1, wherein:

the power line includes a first power line connectable to the rechargeable battery, and a branched power line connectable between the first power line and the authentication management device; and the authentication management device is arranged in the household, enables the branched power line to be connected to an indoor outlet connected to the power supply via the authentication management device, and performs the authentication with the vehicle using the first power line and the branched power line.

7. The charging system according to claim 1, wherein the authentication management device has a unique identifier and is configured as a single ID box capable of performing the authentication with the vehicle using the identifier.

8. The charging system according to claim 7, wherein the ID box is a vehicle key.

9. The charging system according to claim 1, wherein the authentication management device includes:

a communication terminal having a unique identifier; and
a device body, from which the communication terminal is removable, for receiving the identifier from the communication terminal and enabling the authentication with the vehicle to be performed using the identifier.

10. A charging system for use with a household power supply in a household, with the household including an outdoor outlet arranged therein, the charging system including:

an electrically-driven vehicle including a rechargeable battery;

a power line connectable via the outdoor outlet of the household between the rechargeable battery of the vehicle and the household power supply; and an authentication management device, arranged in the household and connectable to the power supply, for performing authentication of the vehicle through an electrical wiring arranged independent from the power line, with the vehicle being placed outside the household;

wherein the vehicle includes:

a switch, connected to the rechargeable battery, for permitting and prohibiting flow of current from the power supply to the rechargeable battery; and a charging control unit for performing the authentication in cooperation with the authentication management device and controlling the switch based on the authentication, wherein when the power line is connected to the outdoor outlet and a charging connector of the vehicle, charging of the rechargeable battery starts before the authentication is started, wherein after the charging of the rechargeable battery is started:

the charging control unit deactivates the switch to prohibit charging of the rechargeable battery with the power supply when the authentication is not established with the authentication management device and the charging control unit;

the charging control unit keeps the switch activated to continue charging the rechargeable battery when the authentication is established with the authentication management device and the charging control unit.

11. The charging system according to claim 10 wherein the authentication management device performs the authentication through communication that uses a code with the vehicle.

12. The charging system according to claim 10 wherein the power line is directly connected to the rechargeable battery and the power supply.

13. The charging system according to claim 10, wherein:

the power line includes a first power line connectable to the rechargeable battery, and a second power line arranged in the household, extended from an indoor outlet connected to the power supply, and connectable to the first power line; and the authentication management device is connectable to the indoor outlet and performs the authentication with the vehicle using the first power line and the second power line.

14. The charging system according to claim 10, wherein:

the power line includes a first power line connectable to the rechargeable battery, and a branched power line connectable between the first power line and the authentication management device; and the authentication management device is arranged in the household, enables the branched power line to be connected to an indoor outlet connected to the power supply via the authentication management device, and performs the authentication with the vehicle using the first power line and the branched power line.

15. The charging system according to claim 10, wherein the authentication management device has a unique identifier and is configured as a single ID box capable of performing the authentication with the vehicle using the identifier.

16. The charging system according to claim 10, wherein the authentication management device includes:

a communication terminal having a unique identifier; and
a device body, from which the communication terminal is removable, for receiving the identifier from the communication terminal and enabling the authentication with the vehicle to be performed using the identifier.

17. A charging system for use with a household power supply in a household, with the household including an outdoor outlet arranged therein, the charging system including:
- an electrically-driven vehicle including a rechargeable battery;
- a primary coil connected to the power supply via the outdoor outlet of the household;
- a secondary coil connected to the rechargeable battery, wherein the rechargeable battery is magnetically connected to the power supply by the primary coil and the secondary coil; and
- an authentication management device, arranged in the household and connectable to the power supply, for performing authentication of the vehicle through the primary coil and the secondary coil, with the vehicle being placed outside the household;

wherein the vehicle includes:
- a switch, connected to the rechargeable battery, for permitting and prohibiting flow of current from the power supply to the rechargeable battery; and
- a charging control unit for performing the authentication in cooperation with the authentication management device and controlling the switch based on the authentication, wherein when the rechargeable battery is connected to the power supply through the primary coil and the secondary coil, charging of the rechargeable battery starts before the authentication is started, wherein after the charging of the rechargeable battery is started:
- the charging control unit deactivates the switch to prohibit charging of the rechargeable battery when the authentication is not established with the authentication management device and the charging control unit;
- the charging control unit keeps the switch activated to continue charging the rechargeable battery when the authentication is established with the authentication management device and the charging control unit.

* * * * *